(12) United States Patent
Kim et al.

(10) Patent No.: US 12,522,189 B2
(45) Date of Patent: Jan. 13, 2026

(54) CONTROL DEVICE STRUCTURE OF BRAKE SYSTEM

(71) Applicant: HL MANDO CORPORATION, Gyeonggi-do (KR)

(72) Inventors: Minseong Kim, Gyeonggi-do (KR); Sang Woo Kim, Gyeonggi-do (KR); Seungcho Han, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 746 days.

(21) Appl. No.: 17/617,268

(22) PCT Filed: Jun. 8, 2020

(86) PCT No.: PCT/KR2020/007420
§ 371 (c)(1),
(2) Date: Dec. 7, 2021

(87) PCT Pub. No.: WO2020/246867
PCT Pub. Date: Dec. 10, 2020

(65) Prior Publication Data
US 2022/0340112 A1    Oct. 27, 2022

(30) Foreign Application Priority Data

Jun. 7, 2019 (KR) .................. 10-2019-0067246
Jun. 7, 2019 (KR) .................. 10-2019-0067247
Jun. 7, 2019 (KR) .................. 10-2019-0067248

(51) Int. Cl.
*B60T 8/92*    (2006.01)
*B60T 8/36*    (2006.01)
(Continued)

(52) U.S. Cl.
CPC ............... *B60T 8/92* (2013.01); *B60T 8/368* (2013.01); *B60T 8/885* (2013.01); *B60T 13/745* (2013.01);
(Continued)

(58) Field of Classification Search
CPC . B60T 8/92; B60T 8/368; B60T 8/885; B60T 13/745; B60T 17/22; B60T 13/74;
(Continued)

(56) References Cited

U.S. PATENT DOCUMENTS

2009/0079259 A1    3/2009  Iwasaki et al.
2009/0189441 A1*   7/2009  Degoul .................. B60T 8/885
                                                   303/3
(Continued)

FOREIGN PATENT DOCUMENTS

CN    108639038    10/2018
CN    108944883    12/2018
(Continued)

OTHER PUBLICATIONS

Office Action dated Sep. 20, 2023 for Chinese Patent Application No. 202080042089.1 and its English machine translation from Google Translate.
(Continued)

*Primary Examiner* — Hunter B Lonsberry
*Assistant Examiner* — Helen Li
(74) *Attorney, Agent, or Firm* — WOMBLE BOND DICKINSON (US) LLP

(57) ABSTRACT

The present invention relates to an electronic control unit (ECU) structure of a brake system, and has an ECU board that is arranged, as an addition, in a symmetric or asymmetric structure in order to form redundancy in preparation for the breakdown of an ECU, and has sensors that are also arranged for implementation of the redundancy, and thus the
(Continued)

brake system can be operated even if a part of the ECU breaks down.

11 Claims, 9 Drawing Sheets

(51) Int. Cl.
| | | |
|---|---|---|
| *B60T 8/88* | (2006.01) | |
| *B60T 13/74* | (2006.01) | |
| *B60T 17/22* | (2006.01) | |
| *H02K 3/50* | (2006.01) | |
| *H02K 7/102* | (2006.01) | |
| *H02K 11/21* | (2016.01) | |
| *H02K 11/33* | (2016.01) | |
| *H02P 25/22* | (2006.01) | |
| *H02P 29/028* | (2016.01) | |

(52) U.S. Cl.
CPC ............... *B60T 17/22* (2013.01); *H02K 3/50* (2013.01); *H02K 7/102* (2013.01); *H02K 11/21* (2016.01); *H02K 11/33* (2016.01); *H02P 25/22* (2013.01); *H02P 29/028* (2013.01); *B60T 13/74* (2013.01); *B60T 2220/04* (2013.01); *B60T 2270/10* (2013.01); *B60T 2270/304* (2013.01); *B60T 2270/402* (2013.01); *B60T 2270/403* (2013.01); *B60T 2270/404* (2013.01); *B60T 2270/413* (2013.01); *B60T 2270/82* (2013.01); *B60T 2270/88* (2013.01); *H02K 2203/09* (2013.01); *H02K 2211/03* (2013.01); *H02K 2213/06* (2013.01)

(58) Field of Classification Search
CPC ............. B60T 2220/04; B60T 2270/10; B60T 2270/304; B60T 2270/402; B60T 2270/403; B60T 2270/404; B60T 2270/413; B60T 2270/82; B60T 2270/88; H02K 11/21; H02K 11/33; H02K 3/50; H02K 7/102; H02K 2203/09; H02K 2211/03; H02K 2213/06; H02P 25/22; H02P 29/028
USPC .......................................................... 701/70
See application file for complete search history.

(56) References Cited

U.S. PATENT DOCUMENTS

| | | |
|---|---|---|
| 2011/0320099 A1 | 12/2011 | Kim |
| 2013/0289842 A1 | 10/2013 | Dabbs |
| 2014/0142829 A1 | 5/2014 | Strengert et al. |
| 2016/0009263 A1* | 1/2016 | Feigel ................. B60T 11/224 303/15 |
| 2016/0107627 A1* | 4/2016 | Lutz ..................... B60T 13/745 324/207.17 |
| 2016/0272173 A1* | 9/2016 | Shin ........................ B60T 8/172 |
| 2018/0065609 A1* | 3/2018 | Leiber .................. B60T 13/745 |
| 2018/0099652 A1 | 4/2018 | Jung |
| 2019/0100237 A1* | 4/2019 | Klesing ................ B62D 5/0493 |
| 2019/0207473 A1* | 7/2019 | Kato ..................... H02K 5/1732 |
| 2019/0217837 A1* | 7/2019 | Feigel .................. B60T 13/686 |
| 2021/0163026 A1 | 6/2021 | Ochida et al. |
| 2022/0073038 A1 | 3/2022 | Suzuki et al. |
| 2022/0266805 A1 | 8/2022 | Park et al. |
| 2024/0045426 A1 | 2/2024 | Ditty et al. |

FOREIGN PATENT DOCUMENTS

| | | | |
|---|---|---|---|
| CN | 108964561 | | 12/2018 |
| CN | 109843672 | | 6/2019 |
| JP | 2009-196626 | | 9/2009 |
| JP | 2009-196627 | | 9/2009 |
| JP | 2009196627 | A * | 9/2009 |
| JP | 2018-118700 | | 8/2018 |
| KR | 10-2012-0000840 | | 1/2012 |
| KR | 10-2016-0049807 | | 5/2016 |
| KR | 10-2018-0126258 | | 11/2018 |
| KR | 10-2019-0032597 | | 3/2019 |
| KR | 10-2019-0038662 | | 4/2019 |
| WO | 2018-210472 | | 11/2018 |

OTHER PUBLICATIONS

Office Action dated Sep. 22, 2023 for Chinese Patent Application No. 202080042136.2 and its English machine translation from Google Translate.
Office Action dated Sep. 22, 2023 for Chinese Patent Application No. 202080042125.4 and its English machine translation from Google Translate.
Extended European Search Report dated Jul. 26, 2023 for European Patent Application No. 20819402.7.
International Search Report for PCT/KR2020/007420 mailed on Sep. 25, 2020 (now published as WO 2020/246867) with English translation provided by WIPO.
Written Opinion of the International Searching Authority for PCT/KR2020/007420 mailed on Sep. 25, 2020 (now published as WO 2020/246867) with English translation provided by WIPO.
Office Action dated Mar. 15, 2024 for U.S. Appl. No. 17/617,275.
Office Action dated Mar. 13, 2024 for U.S. Appl. No. 17/617,281.
Office Action dated Oct. 22, 2024 for Korean Patent Application No. 10-2020-0069323 and its English translation from Global Dossier.
Office Action dated Oct. 26, 2024 for Korean Patent Application No. 10-2020-0069324 and its English translation from Global Dossier.
Office Action dated Oct. 31, 2024 for Korean Patent Application No. 10-2020-0069325 and its English translation from Global Dossier.

* cited by examiner

CONTROL DEVICE STRUCTURE OF BRAKE SYSTEM

CROSS-REFERENCE TO RELATED APPLICATIONS

The present application is the national stage of International Patent Application No. PCT/KR2020/007420 filed on Jun. 8, 2020, which claims the priority to Korean Patent Application No. 10-2019-0067246 filed in the Korean Intellectual Office on Jun. 7, 2019, Korean Patent Application No. 10-2019-0067247 filed in the Korean Intellectual Office on Jun. 7, 2019, and Korean Patent Application No. 10-2019-0067248 filed on Jun. 7, 2019 in the Korean Intellectual Office, the entire contents of which are incorporated herein by reference.

TECHNICAL FIELD

The present invention relates to a vehicle, and more particularly, to a structure of a brake system for a vehicle.

BACKGROUND ART

A brake system is absolutely necessary for a vehicle. This is because a vehicle that cannot be stopped cannot travel. Therefore, for the safety of passengers, the stability of a brake system cannot be emphasized enough.

Recently, as an interest in autonomous vehicles and electric vehicles has increased, brake systems have also been required to have stronger braking power and stability. To this end, an electronic master booster has been used instead of the conventional hydraulic system, and an integrated dynamic brake (IDB) system, in which an anti-lock brake system (ABS) and an electronic stability control (ESC) system are integrated, has been developed. The use of such an IDB system has made it possible to reduce the size and weight of a brake system and has brought results of providing various functions and significantly improving stability.

However, since such an IDB system includes many electronic devices, the IDB system always has a risk of a failure. When, during driving of a vehicle, a brake system fails and is in an inoperable state, it can lead to a serious accident, and thus, it is necessary to prepare for the inoperable state of the brake system.

The inventors of the present invention have made efforts to solve the problems of brake systems according to the related art. The inventors of the present invention have completed the present invention after much effort to complete a system capable of normally operating a brake system in response to an unexpected situation even when a part of the brake system fails.

DISCLOSURE

Technical Problem

The present invention is directed to providing a structure of a brake system in which an entire system can operate normally even when a part of the system fails.

Meanwhile, other objects of the present invention which are not explicitly stated will be further considered within the scope easily deduced from the following detailed description and the effects thereof.

Technical Solution

According to an exemplary embodiment of the present invention, an electronic control unit (ECU) assembly structure of a brake system includes a housing having spaces separated by a partition, a first control unit and a second control unit which are independently disposed in the spaces separated by the partition, a first microcontroller unit (MCU) and a second MCU respectively positioned on the first control unit and the second control unit, a cover configured to cover the spaces in which the first control unit and the second control unit are disposed, and a bus bar disposed to pass through the partition to connect the first control unit and the second control unit, wherein the second control unit constitutes redundancy of the first control unit to perform the same function as the first control unit, and a motor, a coil, and a pedal sensor connected to the first control unit and the second control unit are connected to the first control unit and the second control unit in a symmetrical structure.

The ECU assembly structure may include a dual winding motor having a central axis positioned on an extension line of the partition configured to separate the spaces in which the first control unit and the second control unit are disposed, wherein a first connector of the dual winding motor is connected directly to the first control unit, and a second connector the dual winding motor is connected directly to the second control unit.

The ECU assembly structure may further include a motor having a central axis positioned on an extension line of the partition at which the first control unit and the second control unit face each other, wherein a first motor position sensor and a second motor position sensor are respectively disposed at corresponding positions of the first control unit and the second control unit within a radius of a magnet of the motor.

The ECU assembly structure may further include a coil commonly connected to the first control unit and the second control unit, wherein the coil is connected to the first control unit through a first bus bar and is connected to the second control unit through a second bus bar.

According to another exemplary embodiment of the present invention, an ECU assembly structure of a brake system includes a housing having spaces separated by a partition, a first control unit and a second control unit which are independently disposed in the spaces separated by the partition, a first MCU and a second MCU respectively positioned on the first control unit and the second control unit, a cover configured to cover the spaces in which the first control unit and the second control unit are disposed, and a bus bar disposed to pass through the partition and connect the first control unit and the second control unit.

The second control unit may constitute redundancy of the first control unit to perform the same function as the first control unit, and the first control unit and the second control unit may have an asymmetric structure in which connected components are not the same.

The ECU assembly structure may further include a pedal sensor having two or more output channels, wherein the pedal sensor is connected to a third printed circuit board (PCB), a first channel output of the pedal sensor is connected from the third PCB to the first control unit through a fourth bus bar, a second channel output of the pedal sensor is connected from the third PCB to the second control unit through a fifth bus bar, and a center of a third PCB is positioned close to the first control unit so that the fourth bus bar passes through the partition configured to separate the spaces of the first control unit and the second control unit.

The ECU assembly structure may further include a first pedal sensor, a second pedal sensor, a fourth PCB, and a fifth PCB, wherein an output of the first pedal sensor is connected to the first control unit through the fourth PCB, and an output of the second pedal sensor is connected to the second control unit through the fifth PCB.

The ECU assembly structure may further include a first pressure sensor, a second pressure sensor, and a third pressure sensor, wherein the first pressure sensor and the second pressure sensor are connected to a pattern of the first control unit to be connected to the first MCU on the first control unit, and the third pressure sensor is connected to a pattern of the second control unit to be connected to the second MCU on the second control unit.

The ECU assembly structure may further include a first coil and a second coil, wherein the first coil is connected directly to the first control unit and is connected to the second control unit through a sixth bus bar, and the second coil is connected directly to the second control unit and is connected to the first control unit through a seventh bus bar.

The ECU assembly structure may further include a third coil, a fourth coil, a third PCB, and a fourth PCB, wherein the third coil is connected to the third PCB, the third PCB is connected to the first control unit through an eighth bus bar, the fourth coil is connected to the fourth PCB, and the fourth PCB is connected to the second control unit through a ninth bus bar.

Advantageous Effects

According to the present invention, by providing redundant printed circuit boards (PCBs) having the same structure, even when one PCB fails, the redundant PCB performs the same function, and thus, it is possible to cope with an emergency situation, thereby increasing the stability of a brake system.

Meanwhile, even if the effects are not explicitly mentioned here, the effects described in the following specification, which are expected by the technical characteristics of the present invention, and the provisional effects thereof are handled as described in the specification of the present invention.

※ The accompanying drawings are included to provide a further understanding of the technical idea of the present invention, and thus the scope of the present invention is not limited thereto.

MODES OF THE INVENTION

Hereinafter, a configuration of the present invention guided by various exemplary embodiments of the present invention and effects resulting from the configuration will be described with reference to the accompanying drawings. In describing the present invention, the detailed descriptions of the related known-functions that are obvious to a person skilled in the art and would unnecessarily obscure the subject of the present invention are omitted.

Terms such as "first," "second," and the like may be used to describe various components, but the components should not be limited by the above terms. The terms may be used only for the purpose of distinguishing one component from another component. For example, without departing from the scope of the present invention, a "first component" may be called a "second component," and similarly, a "second component" may also be called a "first component." In addition, a singular expression may include a plural expression, unless otherwise specified. The terms used in the exemplary embodiments of the present invention may be interpreted with the commonly known meaning to those of ordinary skill in the relevant technical field unless otherwise specified.

Hereinafter, a configuration of the present invention guided by various exemplary embodiments of the present invention and effects resulting from the configuration will be described with reference to the accompanying drawings.

Figure 1:
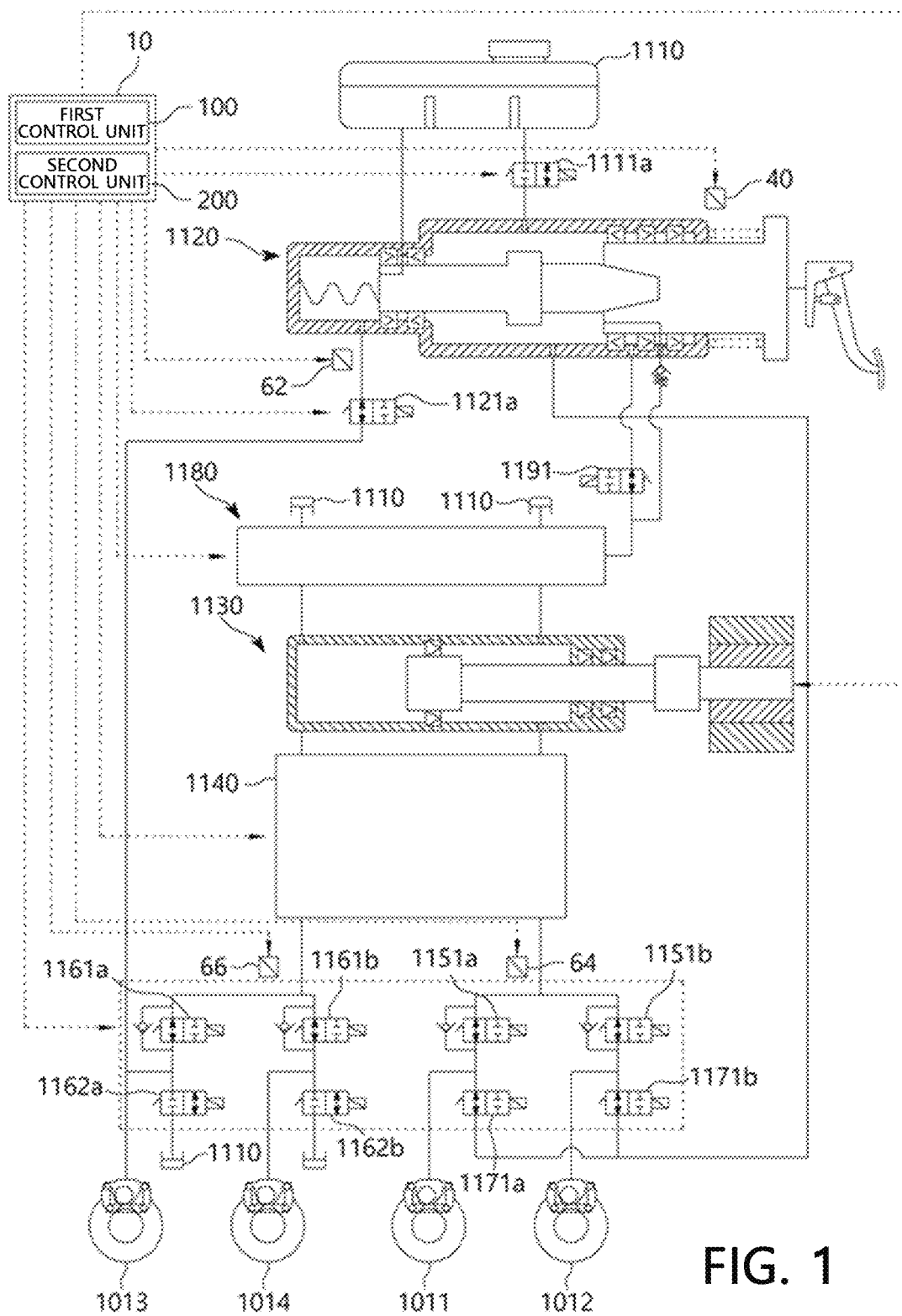
FIG. 1 is a schematic structural diagram of a brake system according to an exemplary embodiment of the present invention.

FIG. 1 is a schematic structural diagram of the entirety of a brake system according to an exemplary embodiment of the present invention.

The brake system includes a reservoir 1110, a master cylinder 1120, a hydraulic pressure supply device 1130, a hydraulic control unit 1140, a dump control unit 1180, valves and sensors for controlling channels, and an electronic control unit (ECU) for controlling the components.

The reservoir 1110 stores a pressure medium that flows along a flow path to generate pressure. The pressure medium flows to a required place according to an adjustment of a valve. A simulator valve 1111a formed in a flow path of the reservoir 1110 controls a flow of a pressure medium between the reservoir 1110 and the master cylinder 1120. During normal operation, the simulator valve 1111a is opened so that a user links the reservoir 1110 and the master cylinder 1120. In an abnormal operation mode, the simulator valve 1111a is closed so that a pressure medium of the master cylinder 1120 is transferred to valves for wheel cylinder control through a backup flow path.

When a driver presses a brake pedal, the master cylinder 1120 pressurizes and discharges a pressure medium such as brake oil accommodated therein. Thus, the master cylinder 1120 provides a reaction force according to a braking depression force to the driver. A cut valve 1121a controls a flow of a backup flow path between the master cylinder 1120 and the valves for controlling the wheel cylinders.

The hydraulic pressure supply device 1130 generates hydraulic pressure according to a position of a pedal and transmits the hydraulic pressure to the wheel cylinders of wheels 1011, 1012, 1013, and 1014, whereby a vehicle is braked. The hydraulic pressure supply device 1130 includes a motor to generate hydraulic pressure.

The hydraulic control unit 1140 controls the hydraulic pressure provided from the hydraulic pressure supply device 1130.

The dump control unit 1180 controls a flow of a pressure medium between the reservoir 1110 and the hydraulic pressure supply device 1130.

Each valve opens or closes a flow path formed between the reservoir 1110 and the master cylinder 1120 or the reservoir 1110 and the hydraulic pressure supply device 1130 to control a flow of a pressure medium. The valves are provided as check valves formed to allow only one direction flow without the need for control or solenoid valves of which opening and closing are controlled under control of an ECU 10.

Inlet valves 1161a, 1161b, 1151a, and 1151b control a flow of a pressure medium supplied from the hydraulic pressure supply device 1130 to the wheel cylinders.

Outlet valves 1162a and 1162b control a flow of a pressurize medium discharged from the wheel cylinders to the reservoir 1110.

Furthermore, other outlet valves 1171a and 1171b control a flow of a pressure medium between the wheel cylinders and the master cylinder 1120.

A diagnostic valve 1191 is used when a diagnostic mode of examining a failure of other valves or a leak in a flow path is performed.

The ECU receives signals from sensors 40, 62, 64, and 66 and controls the respective valves or the motor included in the hydraulic pressure supply device 1130 to control the operation of the brake system.

Figure 2:
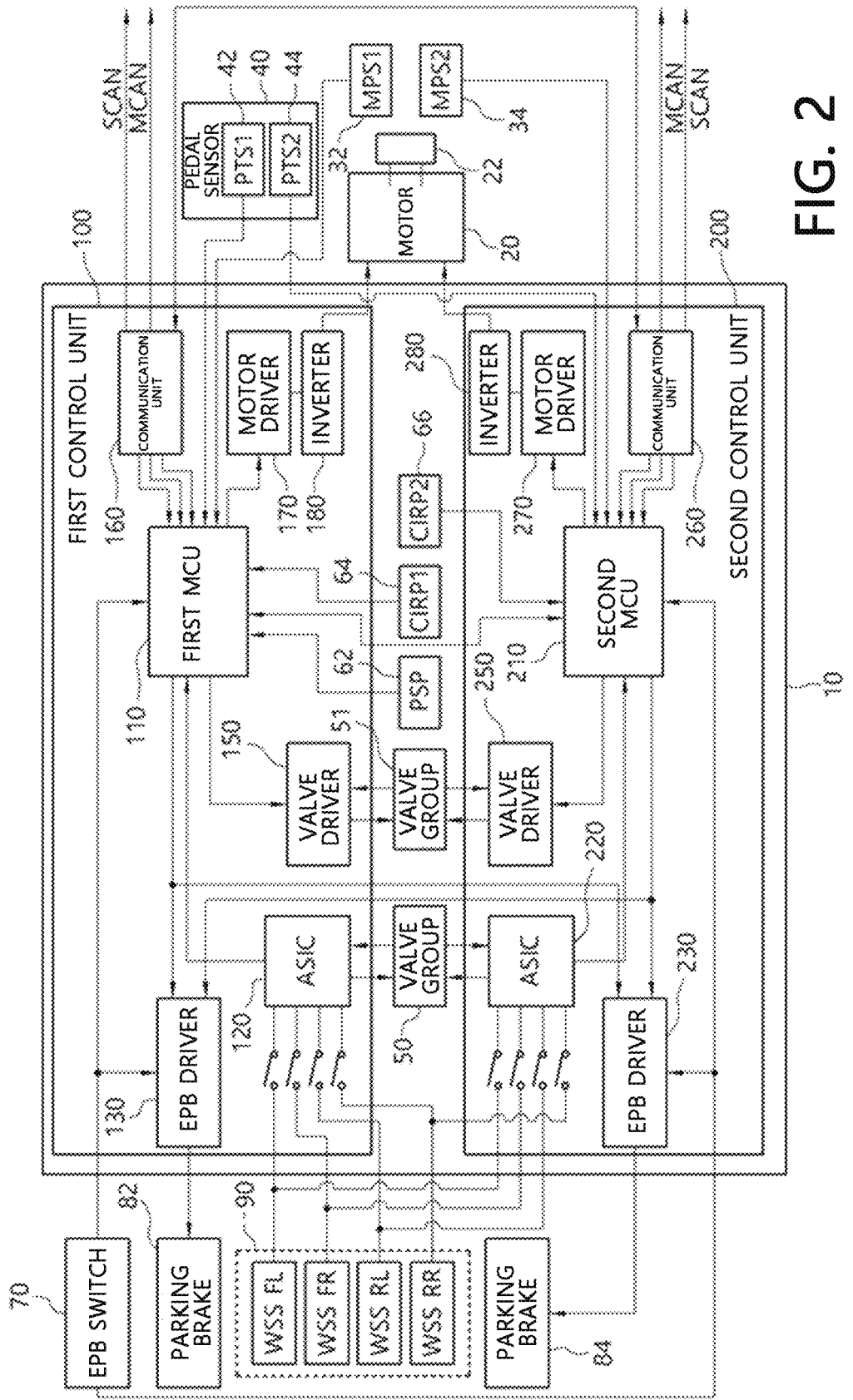
FIG. 2 is a schematic structural diagram of an electronic control unit (ECU) of a brake system according to an exemplary embodiment of the present invention.

FIG. 2 is a diagram illustrating an overall structure of an ECU 10.

The ECU 10 includes a first control unit 100 including a first microcontroller unit (MCU) 110 and a second control unit 200 including a second MCU 210.

The first MCU 110 has a structure that receives inputs from motor position sensors 32 and 34, a pedal sensor 40, pressure sensors 62, 64, and 66, and the like to control a motor 20, a valve 50, parking brakes 82 and 84, and the like.

Figure 3:
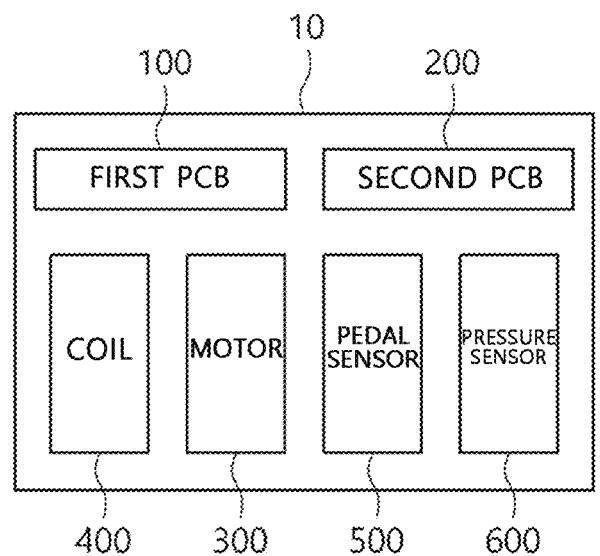
FIG. 3 is a diagram illustrating a structure of an ECU in more detail.

FIG. 3 is a diagram illustrating a structure of an ECU 10 in more detail.

The ECU 10 may include a first control unit 100 implemented on a first printed circuit board (PCB) 100, a second control unit 200 implemented on the second PCB 200, a motor 300, a coil 400, a pedal sensor 500, and a pressure sensor 600.

The first control unit 100 and the second control unit 200 may each include a first MCU and a second MCU which receive inputs from sensors and control the motor 300 or the coil 400 and may include drivers which drive the motor 300, valves, or the like.

The MCU included in the first control unit 100 or the second control unit 200 controls the motor 300 of a hydraulic pressure supply device 1300 according to an input of the pedal sensor 500 or the pressure sensor 600 or controls valves of flow paths through the coil 400. The second control unit 200 may constitute redundancy of the first control unit 100 and may have a symmetrical structure or an asymmetrical structure with the first control unit 100.

The motor 300 is positioned in the hydraulic pressure supply device 1300 and generates hydraulic pressure under control of the MCU. In order to control a position of the motor 300, the ECU 10 may further include a motor position sensor (MPS, not shown).

The coil 400 controls valves positioned in flow paths of a brake system. The MCU controls the coil 400 to control the opening and closing of the valve, thereby controlling a flow in the flow path.

The pedal sensor 500 measures a position of a pedal. According to the position of the pedal measured by the pedal sensor 500, the MCU may control the hydraulic pressure supply device 1300 to supply a pressure medium to wheels 91, 92, 93, and 94, thereby controlling a brake.

The pressure sensor 600 is used to control the flow paths in the brake system. The pressure sensor 600 may be a pedal simulator pressure (PSP) sensor for forming a pedal feeling or a circuit pressure (CIRP) sensor for measuring pressure between the hydraulic pressure supply device 1130 and wheel cylinders.

Figure 4:
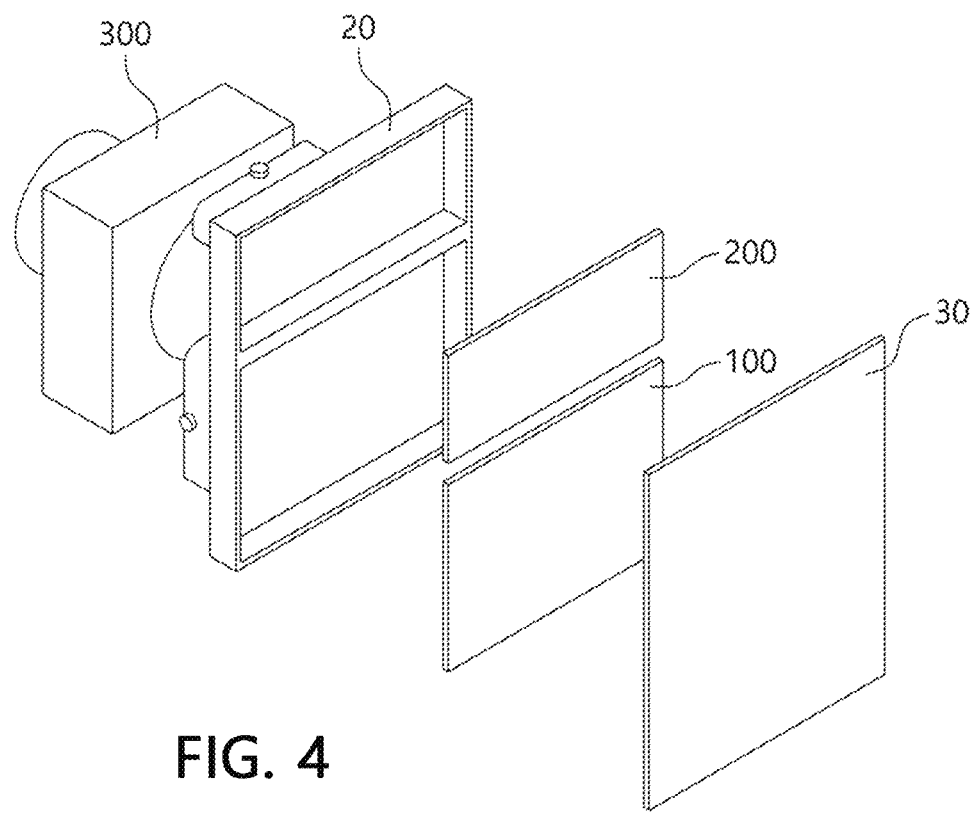
FIG. 4 is an exploded perspective diagram of a brake system according to an exemplary embodiment of the present invention.

FIG. 4 is an example of an exploded perspective diagram of an ECU 10.

A housing 20 is positioned between a motor 300 and a hydraulic block, and PCBs. Coils 400 and bus bars are connected to the housing to connect respective sensors and the PCBs or connect a first control unit 100 and a second control unit 200.

A cover 30 covers the first control unit 100 and the second control unit 200 positioned in the housing 20 and also serves as a heat sink.

Figure 5:
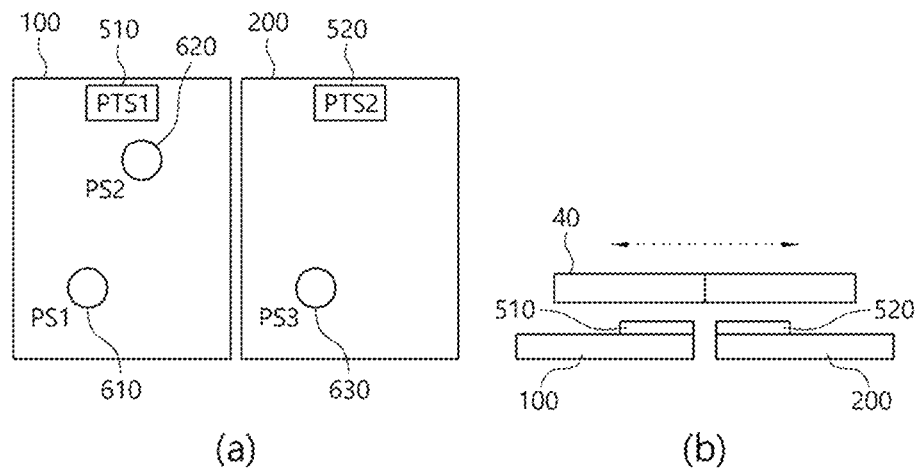
FIG. 5 illustrates an arrangement state of sensors according to an exemplary embodiment of the present invention.

FIG. 5 illustrates an example of an arrangement of sensors.

A first control unit 100 and a second control unit 200 may have a symmetrical or asymmetrical shape, and sensors may also be disposed symmetrically or asymmetrically.

In FIG. 5A, the first control unit 100 and the second control unit have a symmetrical form, and a first pedal sensor 510 and a second pedal sensor 520 are also disposed in a symmetrical form. A first pressure sensor (PS1) 610 for measuring pedal simulation pressure may be connected only to the first control unit 100 and thus be asymmetrical, but a second pressure sensor (PS2) 620 and a third pressure sensor (PS3) 630 may be the same sensor and thus have a symmetrical relationship.

FIG. 5B illustrates an operating principle of a pedal sensor.

As a magnet 40 moves according to a position of a pedal, the first pedal sensor 510 and the second pedal sensor 520 detect a position of the pedal. The first pedal sensor 510 and the second pedal sensor 520 may output the same value or different values according to settings.

Figure 6:
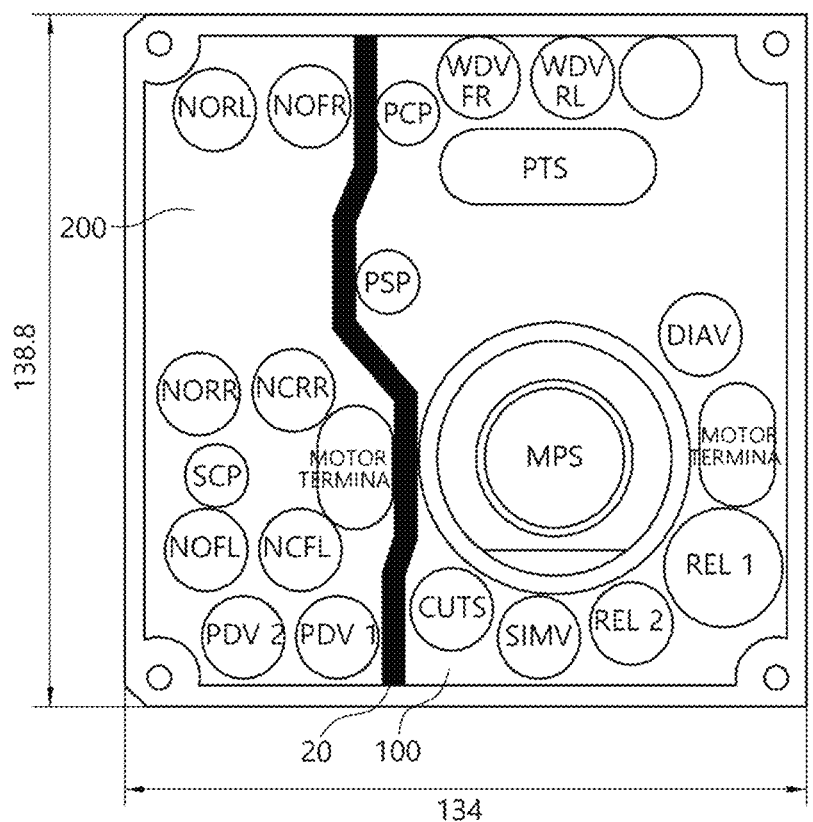
FIGS. 6 and 7 illustrate a state in which sensors are disposed on a printed circuit board (PCB) according to an exemplary embodiment of the present invention.
Figure 7:
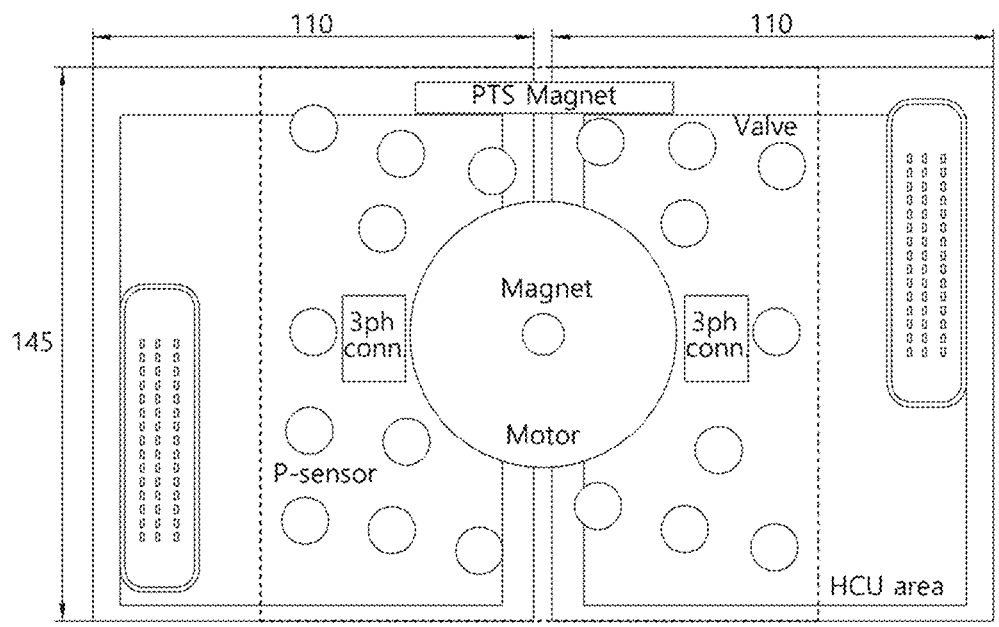

FIGS. 6 and 7 illustrate examples of a symmetrical structure and an asymmetrical structure of a first control unit and a second control unit.

FIG. 6 illustrates an arrangement structure of sensors and valves in an ECU according to an exemplary embodiment of the present invention.

FIG. 6 illustrates an asymmetrical structure in which a first control unit 100 and a second control unit 200 are positioned in spaces separated by a housing 20, and a pedal sensor (PTS) is positioned in the first control unit 100. In the present exemplary embodiment, an ECU 10 may have a size with a width of 134 mm and a length of 138.8 mm.

FIG. 7 illustrates a structure of an ECU according to another exemplary embodiment of the present invention.

FIG. 7 illustrates a state in which a first control unit 100 and a second control unit 200 are disposed symmetrically with respect to a motor in the same structure. A PTS magnet is also disposed in a symmetrical structure. The first control unit 100 and the second control unit 200 may be the same size with a width of 110 mm and a length of 145 mm.

Figure 8:
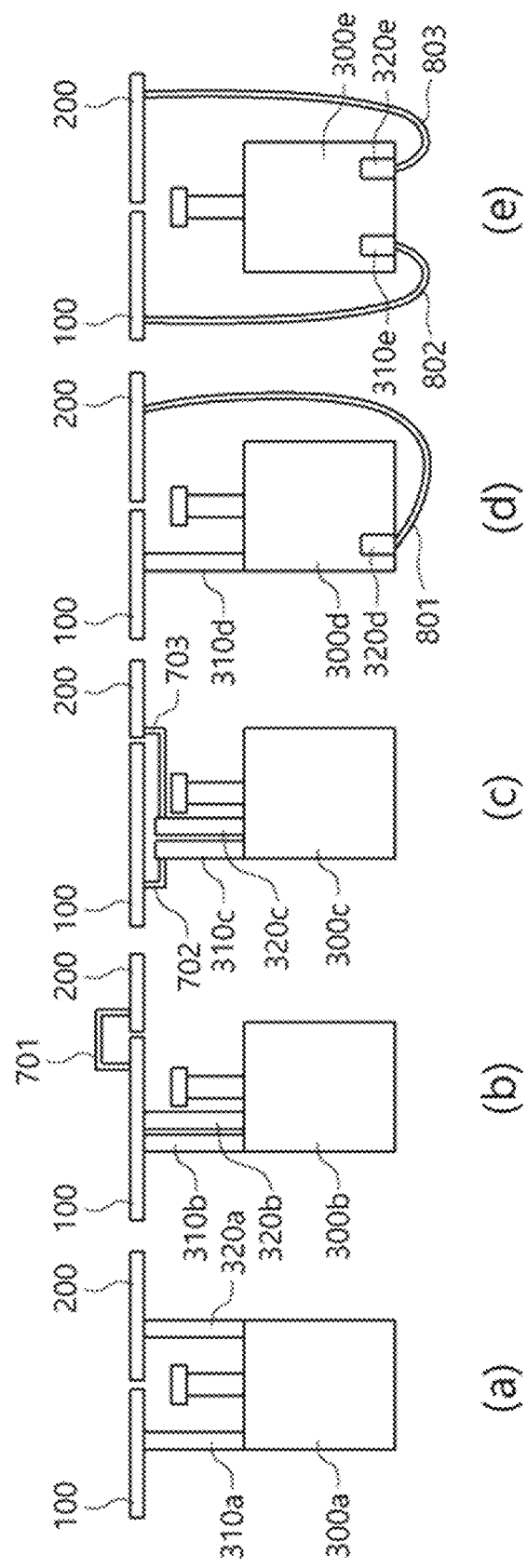
FIG. 8 illustrates connection structures of a motor according to an exemplary embodiment of the present invention.

FIG. 8 illustrates examples of connection structures of a motor according to an exemplary embodiment of the present invention.

In the examples of FIG. 8, a motor 300 may be symmetrically or asymmetrically connected to a first control unit 100 and a second control unit 200.

In FIGS. 8A and 8E, the motor 300 is connected to the first control unit 100 and the second control unit 200 in a symmetrical structure.

In FIG. 8A, a motor 300a is a dual winding motor and includes two sets of connectors 310a and 310b to be connected to the first control unit 100 and the second control unit 200 in a symmetrical structure. A first connector 310a of the motor 300a has a structure that is connected directly to the first control unit 100, and the second connector 310b thereof has a structure that is connected directly to the second control unit 200. When the first control unit 100 does not operate normally, the motor 300a may be driven only by the second control unit 200.

In FIG. 8E, first and second connectors 310e and 320e of a motor 300e are connected to the first control unit 100 and the second control unit 200 through wires 802 and 803. When the connector is positioned at a side opposite to a head of the motor 300e, a connection structure using a wire may be used.

In the structures of FIGS. 8B to 8D, the motor 300 is connected to the first control unit 100 and the second control unit 200 in an asymmetrical structure.

In FIG. 8B, both a first connector 310b and a second connector 320b of a motor 300b are connected directly to the first control unit 100. The second connector 320b connected to the first control unit 100 is connected to the second control unit 200 through a bus bar 701. Accordingly, an MCU of the second control unit 200 may drive the motor 300b.

In FIG. 8C, connectors 310c and 320c of a motor 300c are not connected directly to PCBs unlike in FIG. 8B. A first connector 310c is connected to the first control unit 100 through a second bus bar 702, and a second connector 320c is connected to the second control unit 200 through a third bus bar 703. Due to such a connection structure, even when the first control unit 100 does not operate normally, the second control unit 200 can drive the motor 300c through the third bus bar 703.

FIG. 8D illustrates a connection structure of a motor 300d in which connectors 310d and 320d are positioned at opposite sides. A first connector 310d positioned at a head side of the motor 300d is connected directly to the first control unit 100. A second connector 320d positioned at a side opposite to the head of the motor 300d has a structure that is connected to the second control unit 200 through a wire 801.

Figure 9:
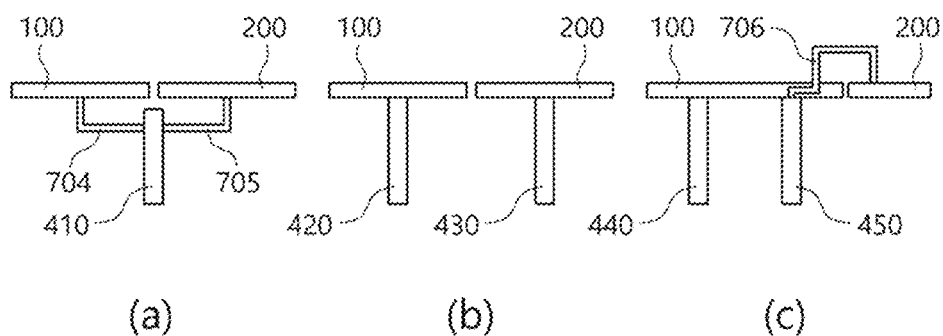
FIG. 9 illustrates arrangement structures of coils according to an exemplary embodiment of the present invention.

FIG. 9 illustrates connection structures of coils for controlling a flow valve of a brake system.

In FIG. 9A, a coil 410 is connected to a PCB through a bus bar 704. The coil 410 is connected to a first control unit through a fourth bus bar 704 and is connected to a second control unit 200 through a fifth bus bar 705. Since the coil 410 is connected to both PCBs at the same time, the second control unit 200 may control the coil 410 in a situation in which a first control unit 100 fails.

FIG. 9B illustrates a structure in which a second coil 420 and a third coil 430 are connected to PCBs. Since the second coil 420 is connected directly to a first control unit 100 and the third coil 430 is connected directly to a second control unit 200, each PCB may independently control the coil connected to each PCB.

FIG. 9C illustrates a structure in which coils are asymmetrically connected to PCBs. Both a fourth coil 440 and a fifth coil 450 are connected to a first control unit 100, and a fifth coil 450 is connected to a second control unit 200 through a bus bar 706.

Figure 10:
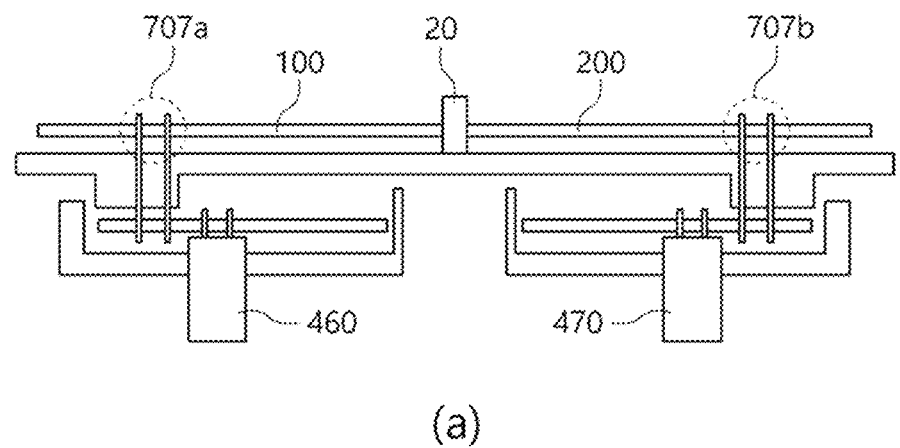
FIG. 10 illustrates arrangement structures of coils according to another exemplary embodiment of the present invention.
Figure 10:
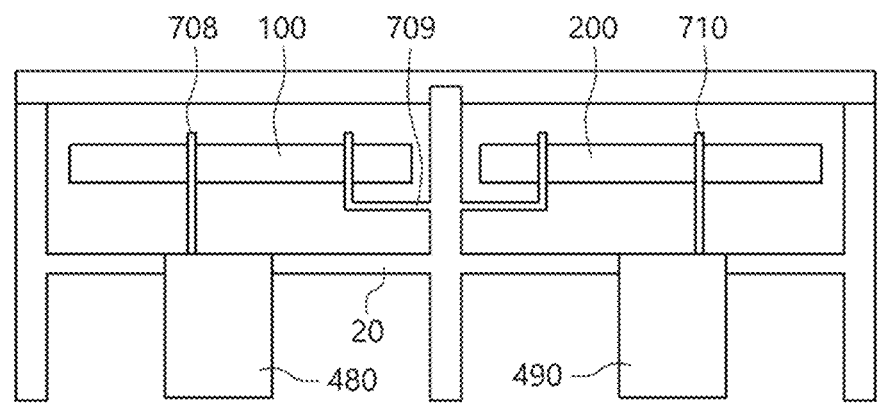

FIG. 10 is an exemplary diagram illustrating other connection structures of coils.

In FIG. 10A, a sixth coil 460 and a seventh coil 470 are connected to a first control unit 100 and a second control unit 200 through bus bars 707a and 707b. The sixth coil 460 and the seventh coil 470 are connected to pattern PCBs, and the pattern PCBs are connected to the first control unit 100 and the second control unit 200 again through the bus bars 707a and 707b. The bus bars 707a and 707b connect the pattern PCBs to the first control unit 100 and the second control unit 200 separated by a housing 20.

FIG. 10B illustrates a structure in which coils are connected to different PCBs.

Coils 480 and 490 are connected to PCBs 100 and 200 in spaces separated by a housing 20 through bus bars 708 and 710.

An eighth coil 480 is connected to a first control unit 100 through an eighth bus bar 708 and is connected to a second control unit 200 again through a ninth bus bar 709. Similarly, a ninth coil 490 is connected to the second control unit 200 through a tenth bus bar 710 and is connected to the first control unit 100 through another bus bar. Due to such a connection structure, MCUs of the first control unit 100 and the second control unit 200 may also control the coils connected to different PCBs.

Figure 11:
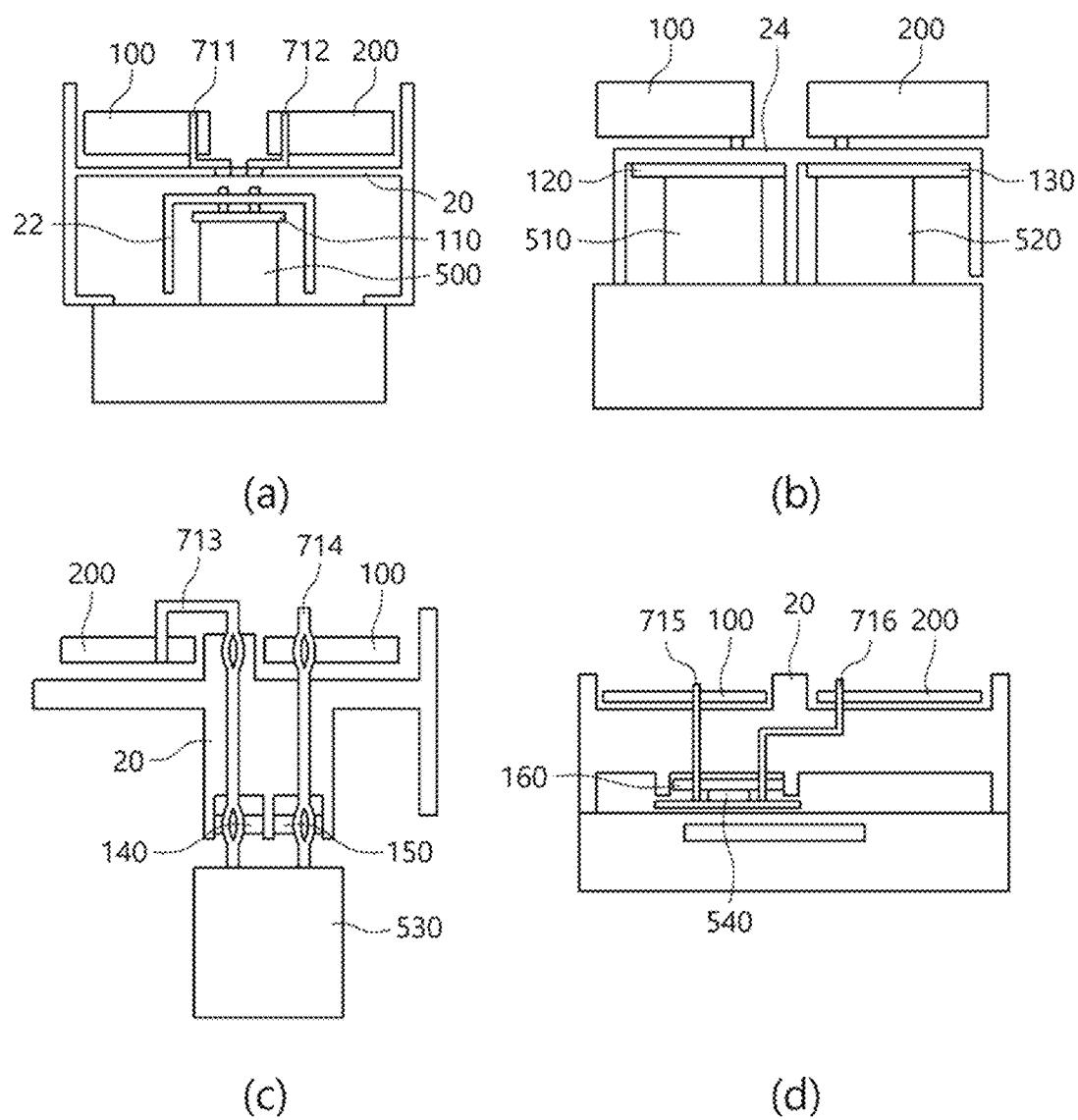
FIG. 11 illustrates arrangement structures of a pedal sensor according to another exemplary embodiment of the present invention.

FIG. 11 illustrates connection structures of a pedal sensor according to an exemplary embodiment of the present invention.

In FIG. 11A, a pedal sensor 500 has outputs of two channels. Therefore, the channels may be connected to different PCBs. FIG. 11A illustrates a structure in which the pedal sensor 500 is connected directly to a pattern PCB 110 to be connected to a housing 20, and thus, the channels are connected to a first control unit 100 and a second control unit 200 through bus bars 711 and 712.

FIG. 11B illustrates a case in which two separate pedal sensors are used instead of one pedal sensor. FIG. 11B illustrates a structure in which a first pedal sensor 510 is connected to a second pattern PCB 120 and is connected to a connector in a housing 24 to be connected to a first control unit 100, and a second pedal sensor 520 is also connected to a second control unit 200 through a third pattern PCB 130.

In FIG. 11C, outputs of two channels of a pedal sensor 530 are connected to pattern PCBs 140 and 150. The pattern PCBs 140 and 150 may be formed as one PCB. Two outputs may pass through a housing 20 through bus bars 713 and 714 and may be connected to a first control unit 100 and a second control unit 200.

FIG. 11D also illustrates a structure in which outputs of two channels of a pedal sensor 540 are connected to PCBs through bus bars. The pedal sensor 540 is connected to a pattern PCB 160, and a first control unit 100 and a second control unit 200, which are positioned in spaces separated by the pattern PCB 160 and a housing 20, are connected through bus bars 715 and 716. In this case, a position of the pedal sensor 540 may be biased toward the first control unit 100 or the second control unit 200 rather than between the first control unit 100 and the second control unit 200.

Figure 12:
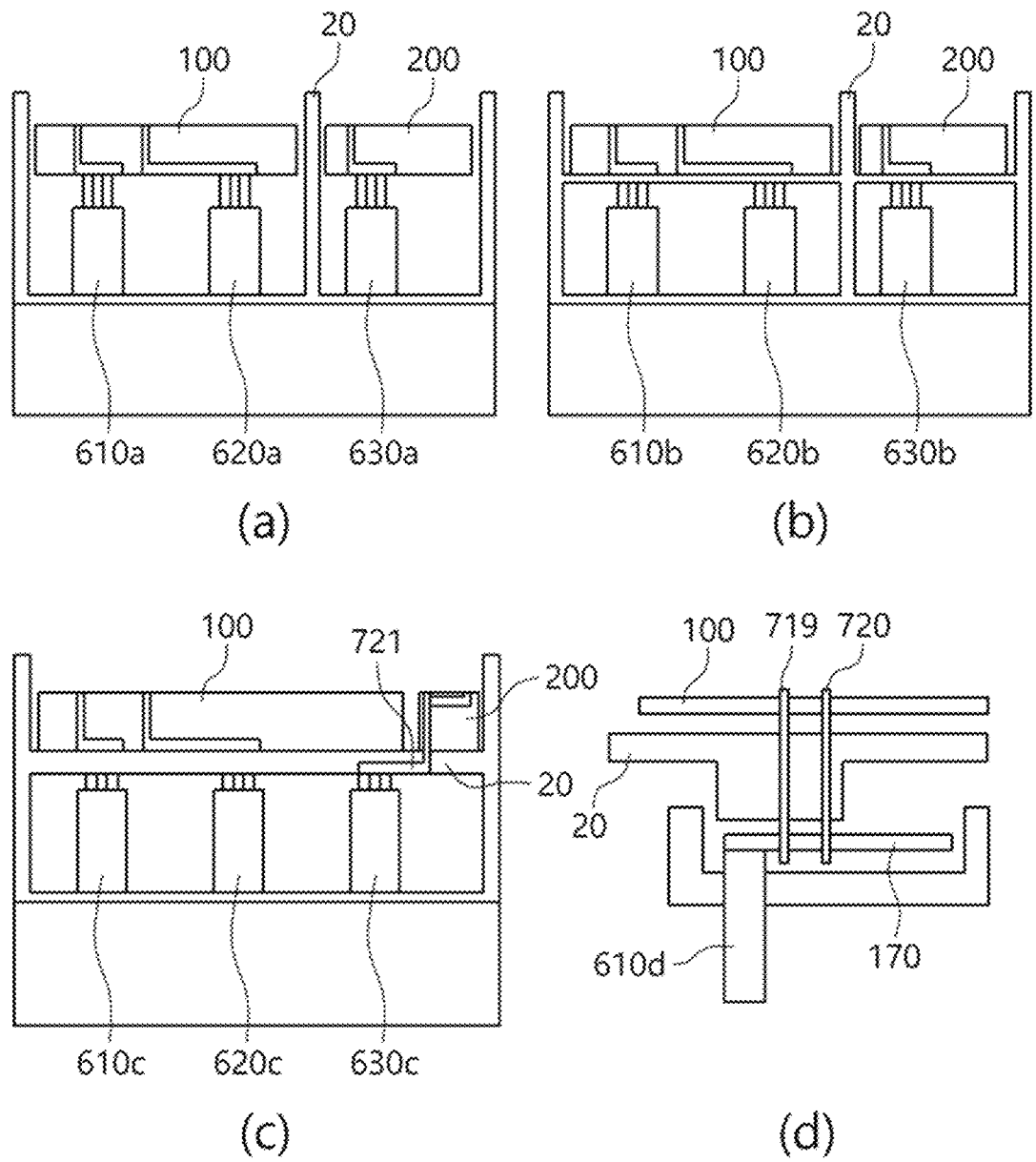
FIG. 12 illustrates arrangement structures of pressure sensors according to an exemplary embodiment of the present invention.

FIG. 12 illustrates connection structures of pressure sensors.

In FIG. 12A, a first pressure sensor 610a and a second pressure sensor 620a are connected to a first control unit 100, and a third pressure sensor 630a is connected to a second control unit 200.

The first pressure sensor 610a and the second pressure sensor 620a are connected directly to the first control unit 100 and are connected to an MCU through a pattern of the first control unit 100. The third pressure sensor 630a is also connected directly to the second control unit 200 and is connected to an MCU through a pattern of the second control unit 200.

Even in FIG. 12B, a first pressure sensor 610b and a second pressure sensor 620b are connected to a first control unit 100, and a third pressure sensor 630b is connected to a second control unit 200. Unlike in FIG. 9A, the pressure sensors are positioned in spaces separated from the first control unit 100 and the second control unit 200 by a housing 20, and the pressure sensors are connected to the housing 20 to be connected to the first control unit 100 and the second control unit 200 through bus bars of the housing 20.

FIG. 12C illustrates a connection structure of pressure sensors when a housing 20 does not separate a first control unit 100 and a second control unit 200 from each other.

The housing 20 separates the first and second control units 100 and 200 from pressure sensors 610c, 620c, and 630c. Accordingly, the pressure sensors 610c, 620c, and 630c are connected to the housing 20 to be connected to MCUs through patterns or bus bars. A first pressure sensor 610c and a second pressure sensor 620c are connected to the MCU through a pattern of the first control unit 10. A third pressure sensor 630c is connected to a connector of the housing 20 and is connected to the second control unit 200 through a bus bar 721. In this case, the third pressure sensor 630c may be positioned at a side of the first control unit 100.

FIG. 12D illustrates that a pressure sensor is connected through a bus bar and a pattern PCB.

Unlike the previous examples, a pressure sensor 610d is not connected to a connector of a housing 20 and is connected to a pattern PCB 170, and the pattern PCB 170 and a first control unit 100 are connected through bus bars 719 and 720 so that the pressure sensor may be connected to an MCU.

The protection scope of the present invention is not limited to the disclosure and expressions of the exemplary embodiment clearly described above. In addition, it is added that the protection scope of the present invention is not limited by modifications and substitutions obvious to the technical field to which the present invention pertains.

The invention claimed is:

1. An electronic control unit (ECU) assembly structure of a brake system, comprising:
   a housing having spaces separated by a partition;
   a first control unit and a second control unit which are independently disposed in the spaces separated by the partition;
   a first microcontroller unit (MCU) and a second MCU respectively positioned on the first control unit and the second control unit;
   a cover configured to cover the spaces in which the first control unit and the second control unit are disposed;
   a bus bar disposed to pass through the partition to connect the first control unit and the second control unit;
   a motor; and
   a first motor position sensor and a second motor position sensor which are disposed within a radius of a magnet mounted to the motor and connected to the first control unit and the second control unit, respectively,
   wherein:
   the second control unit constitutes redundancy of the first control unit to perform the same function as the first control unit; and
   the motor, a coil, and a pedal sensor connected to the first control unit and the second control unit are connected to the first control unit and the second control unit in a symmetrical structure.

2. The ECU assembly structure of claim 1, further comprising a dual winding motor having a central axis positioned on an extension line of the partition configured to separate the spaces in which the first control unit and the second control unit are disposed,
   wherein:
   a first connector of the dual winding motor is connected directly to the first control unit; and
   a second connector the dual winding motor is connected directly to the second control unit.

3. The ECU assembly structure of claim 1, wherein the motor has a central axis positioned on an extension line of the partition at which the first control unit and the second control unit face each other.

4. The ECU assembly structure of claim 1, further comprising a coil commonly connected to the first control unit and the second control unit,
   wherein the coil is connected to the first control unit through a first bus bar and is connected to the second control unit through a second bus bar.

5. An electronic control unit (ECU) assembly structure of a brake system, comprising:
   a housing having spaces separated by a partition;
   a first control unit and a second control unit which are independently disposed in the spaces separated by the partition;
   a first microcontroller unit (MCU) and a second MCU respectively positioned on the first control unit and the second control unit;
   a cover configured to cover the spaces in which the first control unit and the second control unit are disposed;
   a bus bar disposed to pass through the partition and connect the first control unit and the second control unit;
   a motor; and
   a first motor position sensor and a second motor position sensor which are disposed within a radius of a magnet mounted to the motor and connected to the first control unit and the second control unit, respectively,
   wherein:
   the second control unit constitutes redundancy of the first control unit to perform the same function as the first control unit; and
   the first control unit and the second control unit have an asymmetric structure in which connected components are not the same.

6. The ECU assembly structure of claim 5, further comprising a pedal sensor having two or more output channels,
   wherein:
   the pedal sensor is connected to a third printed circuit board (PCB);
   a first channel output of the pedal sensor is connected from the third PCB to the first control unit through a fourth bus bar;
   a second channel output of the pedal sensor is connected from the third PCB to the second control unit through a fifth bus bar; and a center of the third PCB is positioned close to the first control unit so that the fourth bus bar passes through the partition configured to separate the spaces of the first control unit and the second control unit.

7. The ECU assembly structure of claim 5, further comprising a first pedal sensor, a second pedal sensor, a fourth printed circuit board (PCB), and a fifth PCB,
wherein:
an output of the first pedal sensor is connected to the first control unit through the fourth PCB; and
an output of the second pedal sensor is connected to the second control unit through the fifth PCB.

8. The ECU assembly structure of claim 5, further comprising a first pressure sensor, a second pressure sensor, and a third pressure sensor,
wherein:
the first pressure sensor and the second pressure sensor are connected to a pattern of the first control unit to be connected to the first MCU on the first control unit; and
the third pressure sensor is connected to a pattern of the second control unit to be connected to the second MCU on the second control unit.

9. The ECU assembly structure of claim 5, further comprising a first coil and a second coil,
wherein:
the first coil is connected directly to the first control unit and is connected to the second control unit through a sixth bus bar; and
the second coil is connected directly to the second control unit and is connected to the first control unit through a seventh bus bar.

10. The ECU assembly structure of claim 5, further comprising a third coil, a fourth coil, a third printed circuit board (PCB), and a fourth PCB,
wherein:
the third coil is connected to the third PCB;
the third PCB is connected to the first control unit through an eighth bus bar;
the fourth coil is connected to the fourth PCB; and
the fourth PCB is connected to the second control unit through a ninth bus bar.

11. The ECU assembly structure of claim 6, further comprising another magnet movably arranged above the pedal sensor to detect a position of a pedal and configured to be movable according to movement of the pedal.

* * * * *